J. STAUFFER.
METHOD OF CLEANING SALT.
APPLICATION FILED MAR. 16, 1912.
1,091,252.
Patented Mar. 24, 1914.
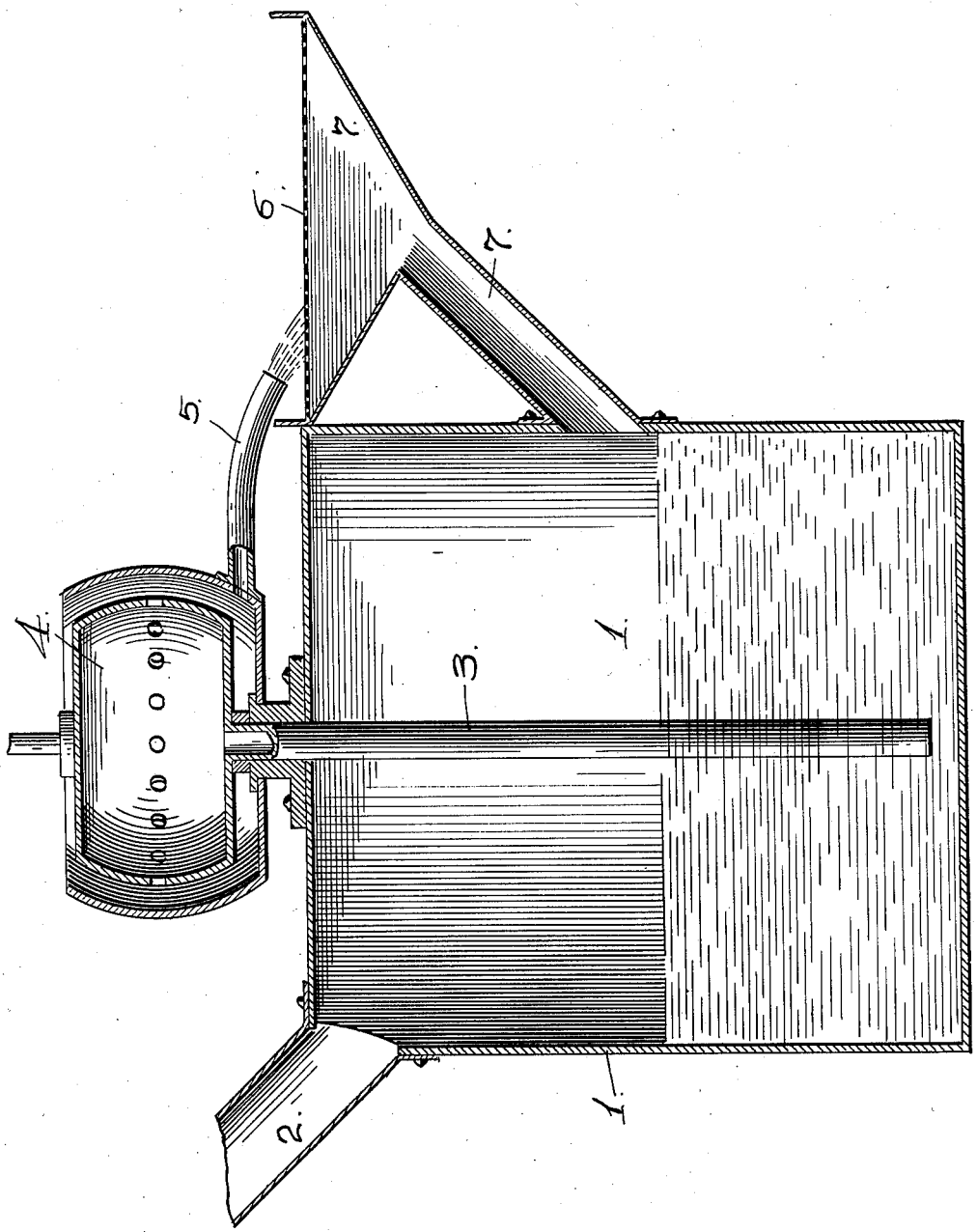
Witnesses:
Arthur L. Slee.
Harry F. Totten.
Inventor
John Stauffer
by N.A. Acker
his atty.

UNITED STATES PATENT OFFICE.

JOHN STAUFFER, OF SAN FRANCISCO, CALIFORNIA, ASSIGNOR TO SAN FRANCISCO SALT REFINERY, OF SAN FRANCISCO, CALIFORNIA, A CORPORATION OF CALIFORNIA.

METHOD OF CLEANING SALT.

1,091,252.   Specification of Letters Patent.   Patented Mar. 24, 1914.

Application filed March 16, 1912. Serial No. 684,201.

*To all whom it may concern:*

Be it known that I, JOHN STAUFFER, a citizen of Germany, residing in the city and county of San Francisco and State of California, have invented certain new and useful Improvements in Methods of Cleaning Salt, of which the following is a specification.

The invention relates to the treatment of salt as received from the evaporating tanks to break up the lumps and wash the crystals to free the same of dirt and foreign substances adhering thereto, the object being to prepare the salt for delivery to the refinery in a washed condition substantially free from dirt and foreign material which settles and intermingles with the salt recovered from a brine solution by the evaporating process.

The method consists in forming a brine solution full to the point of saturation, placing therein the lumps of salt or salt crust to be treated, subjecting the same to agitation while immersed in said saturated solution to break the lumps and wash the salt crystals thereby released, and finally separating the washed salt crystals from the saturated solution.

Inasmuch as the brine solution utilized for washing the salt is impregnated to its point of saturation the salt delivered thereto for treatment cannot dissolve therein, but remains in suspension during the washing treatment.

A simple, effective and durable apparatus for successfully carrying out the improved method is disclosed by the accompanying sheet of drawings, wherein the machine is illustrated in longitudinal section.

In the drawings, the numeral 1 is used to designate a suitable sump of sufficient capacity for the saturated brine solution employed for washing the salt to be cleaned, and 2 a feed chute for the delivery of the salt removed from the evaporating pans or tanks into the said sump 1. By the expression evaporated salt as hereinafter employed is meant the raw material recovered from the settling pans or tank as the result of evaporation of the brine solution delivered therein. Into the sump 1 and within the saturated solution contained therein is extended a suction pipe 3, which leads from the suction side of a centrifugal or suction pump 4. The discharge spout or extension 5 of the pump 4 delivers, in the present case, the issuing stream discharging from the pump onto a collecting screened surface 6, the mesh thereof being of such fineness as to withhold the passing of salt crystals therethrough while permitting the free flow of the saturated solution to a return conduit 7 for conveying the said solution to the sump 1, thereby establishing free circulation for the saturated solution. The salt crystals are thus deposited on the surface of the screen 6, being removed therefrom in any suitable manner.

During operation of the pump 4, a continuous circulation of the saturated solution is maintained, and into the sump 1 the evaporated salt is delivered for treatment. As fed into the saturated solution within the sump, the same acts to wash and clean the free crystals thereof and to partially wash and clean the exterior surface of the lump or crusts of salt. As the saturated solution and the salt held therein is drawn into the pump 4, the runners thereof break up the lumps or crust of salt and frees the crystals, which are then acted on by the saturated solution and freed of dirt and foreign substances adhering thereto, thereby thoroughly washing the salt crystals.

The saturated solution on becoming charged to any great extent with dirt and foreign substances from the crystals, is removed from the sump and is replaced by a new solution, or the dirt and foreign substances may be removed from the solution in any suitable manner while the same is contained in the sump.

The washed crystals being carried in suspension by the flowing or circulating body of the saturated solution, are delivered therewith from the pump 4 onto the collecting screen 6 and there retained, while the saturated solution passing through the said screen enters the conduit 7 and is returned to the sump 1.

Inasmuch as the lumps of evaporated salt or the salt crust delivered into the sump 1 is fragile in character, they offer but slight resistance and break on natural lines of cleavage when submitted under agitation to the action of the circulating saturated solution, so that the salt crystals are released and thoroughly washed and freed of all dirt and foreign substance adhering thereto while conveyed from the sump 1 onto the collecting screen 6, and as thus washed and cleaned the salt is placed in condition for delivery to the refining works for preparation for the market.

Having thus described the invention what is claimed as new and desired to be protected by Letters Patent is—

1. The method of washing, cleaning and breaking lumps of evaporated salt, which consists in forming within a sump a saturated brine solution, subjecting the same to agitation, delivering therein the evaporated crystal salt to be treated, withdrawing the solution and salt held therein in suspension, separating the salt crystals from the solution, and returning the waste solution to the sump.

2. The continuous method of washing and cleaning evaporated salt which consists in forming within a sump a saturated brine solution, placing the solution in agitation by withdrawing the same from within the sump and thence returning the withdrawn solution to the said sump, feeding crusted salt to be treated into the solution within the sump, and separating the salt crystals from the solution as withdrawn from the sump.

In testimony whereof I have signed my name to this specification in the presence of two subscribing witnesses.

JOHN STAUFFER.

Witnesses:
A. FANTZAT,
J. NOHERISNEY.